M. ROTTER.
PACKING.
APPLICATION FILED AUG. 15, 1910.
978,399.
Patented Dec. 13, 1910.
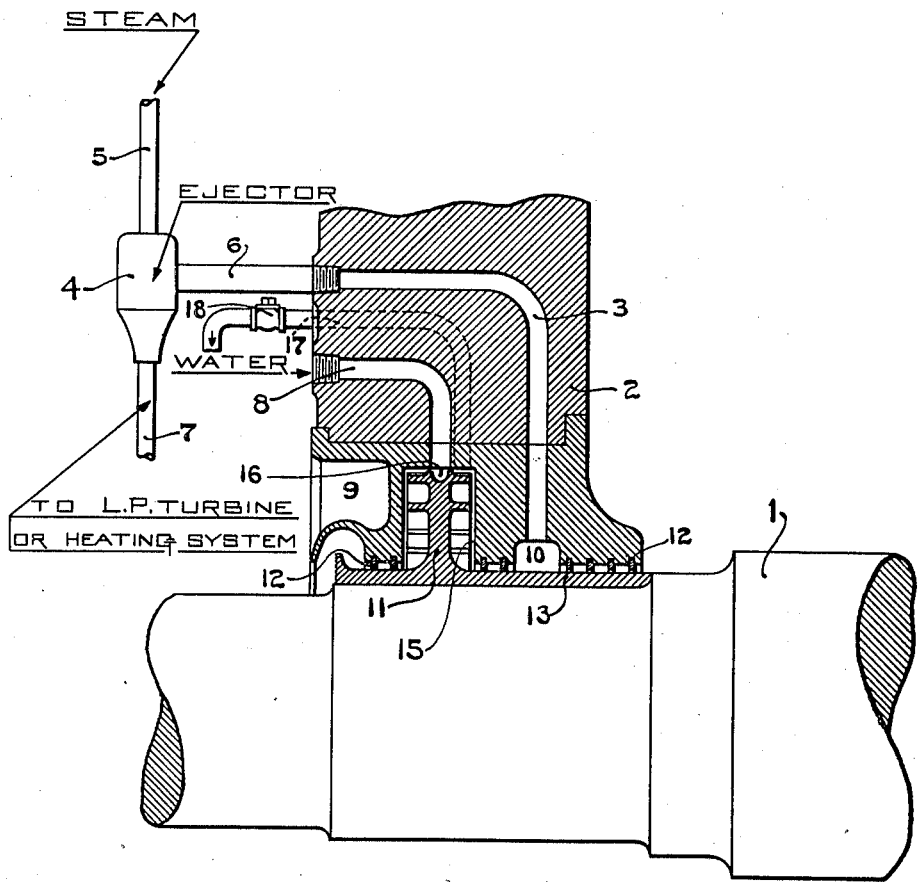
WITNESSES-
W H Lieber
Ella Brickell
Max Rotter INVENTOR-
BY G. J. Wein
ATTORNEY.

UNITED STATES PATENT OFFICE.

MAX ROTTER, OF MILWAUKEE, WISCONSIN, ASSIGNOR TO ALLIS-CHALMERS COMPANY, OF MILWAUKEE, WISCONSIN, A CORPORATION OF NEW JERSEY.

PACKING.

978,399.  Specification of Letters Patent.  Patented Dec. 13, 1910.

Application filed August 15, 1910.  Serial No. 577,148.

*To all whom it may concern:*

Be it known that I, MAX ROTTER, a citizen of the United States, residing at Milwaukee, in the county of Milwaukee and State of Wisconsin, have invented a certain new and useful Improvement in Packing, of which the following is a specification.

This invention relates to improvements in the construction of shaft packing and more particularly to improvements in the construction of packing for rotary shafts such as steam turbine shafts.

The object of the invention is to provide a packing for rotating shafts, which is simple in construction and efficient in operation.

With this invention the exhaust steam from high pressure engines may be used for driving low pressure engines, in heating systems, or for other purposes where it is essential to prevent the admission of air to the steam before its admission to the device utilizing the exhaust steam. Heretofore engines using steam throughout above atmospheric pressure have made use of packing from an intermediate point of which an ejector is applied for the purpose of carrying away the steam that might otherwise leak by the packing to the atmosphere. In doing this the ejector has a tendency to draw air from the outside of the packing and discharge it with the leakage steam. The present invention introduces the well known low-pressure water packed gland between the point of application of the ejector and the atmosphere to prevent the introduction of air into the leakage steam which now becomes applicable to any purpose where the presence of air therein would be objectionable.

A clear conception of one embodiment of the invention can be obtained by referring to the accompanying drawing in which like reference characters designate similar parts. The single figure of the drawing shows a fragment of a rotary shaft, preferably a high pressure turbine shaft, a fragmentary central vertical section through the turbine casing and packing, and means for admitting and ejecting the packing fluid.

The spindle or piston carrying shaft 1, which may be that of a turbine or similar engine, passes through the engine end frame or casing 2 and is mounted in suitable bearings, not shown. The gland runner 11 is formed in one with the gland hub 13, which hub is secured to the shaft 1, being adapted to rotate therewith. The gland runner recess 15 is formed in the gland casing 9, the gland runner 11 extending into and being adjacent the surfaces of the recess 15. The annular clearance space 16 is formed between the periphery of the runner 11 and the circular surface of the recess 15. The gland casing 9 is fastened to the end casing 2 and may be formed in one therewith if so desired. A series of annular calking strips 12 are fixed to the casing 9 extending inwardly therefrom to within a short distance from the periphery of the hub 13. The packing recess 10 is annular in shape and is formed in the gland casing 9 between the gland runner recess 15 and the interior of the engine.

The water inlet passage 8 which connects at one end with any suitable source of liquid supply, not shown, leads to the annular space 16 at the top thereof. The water outlet passage 17 leads from the annular space 16 near the upper part thereof and discharges past a throttle valve 18 to any suitable discharge chamber not shown. The ejector passage 3 connects the annular recess 10 with the end of the pipe 6 which leads to the interior of the ejector 4 of any of the usual types. The ejector steam pipe 5 enters the ejector 4 in line with the ejector nozzle, not shown, which nozzle is directed toward the ejector discharge pipe 7. The discharge pipe 7 is connected with the low pressure turbine, heating system, or other device utilizing the exhaust from the high pressure engine.

During the operation of the engine, the interior of the casing 2 has a pressure above atmospheric established therein. The rotation of the shaft 1 causes the gland runner to rotate within the recess 15. The packing fluid, preferably water, is admitted to the recess 15 through the passage 8 and after becoming heated is eventually discharged through the discharge passage 17. The rotation of the runner 11 forces the water within the recess 15 outward, thereby filling the space 16 between the runner 11 and the casing 9 and forming a liquid seal between these members. The annular calking strips 12 partially prevent the leakage of high pressure fluid from within the casing 2 to the recess 10, and what leakage does occur is withdrawn by the ejector 4 and is discharged therefrom through the pipe 7 to be re-utilized in the auxiliary engine or other device. No air can pass the liquid seal at the runner 10 and thus the delivery of fluid from the ejector is entirely free from air.

It should be understood that it is not desired to be limited to the exact details of construction shown and described, for obvious modifications will occur to a person skilled in the art.

It is claimed and desired to secure by Letters Patent,—

In a packing, a casing wall, a shaft therethrough, baffling means between the wall and shaft, suction means connecting to the space between the wall and shaft at an intermediate point along the baffling means, and a water seal between the wall and shaft at a point between said intermediate point of connection and atmosphere.

In testimony whereof, I affix my signature in the presence of two witnesses.

MAX ROTTER.

Witnesses:
H. C. CASE,
G. F. DE WEIN.